(12) United States Patent
Peterson et al.

(10) Patent No.: US 6,362,547 B1
(45) Date of Patent: Mar. 26, 2002

(54) LINEAR/ROTARY MOTOR AND METHOD OF USE

(75) Inventors: Brian Peterson, Woodbury; Robert Pulford, Jr., Wolcott; Adam Szepesi, Roxbury, all of CT (US)

(73) Assignee: Tri-Tech, Inc., Waterbury, CT (US)

( * ) Notice: Subject to any disclaimer, the term of this patent is extended or adjusted under 35 U.S.C. 154(b) by 1177 days.

(21) Appl. No.: 08/601,726

(22) Filed: Feb. 15, 1996

Related U.S. Application Data

(63) Continuation-in-part of application No. 08/247,891, filed on May 23, 1994.

(51) Int. Cl.[7] .............................. H02K 7/06; H02K 7/10
(52) U.S. Cl. .............................. 310/80; 310/12; 310/13; 310/14
(58) Field of Search ............................... 310/12–14, 80; 318/115

(56) References Cited

U.S. PATENT DOCUMENTS

| | | | | |
|---|---|---|---|---|
| 3,407,680 A | * | 10/1968 | Westmoreland | 74/424 |
| 3,894,275 A | * | 7/1975 | Baumans et al. | 318/38 |
| 3,898,487 A | * | 8/1975 | Sobiepanek et al. | 310/80 |
| 4,099,106 A | * | 7/1978 | Nikaido | 318/115 |
| 4,118,943 A | * | 10/1978 | Chellis | 62/6 |
| 4,234,831 A | * | 11/1980 | Kemmer et al. | 318/115 |
| 4,768,911 A | * | 9/1988 | Balter | 414/3 |

* cited by examiner

*Primary Examiner*—Elvin Enad
(74) *Attorney, Agent, or Firm*—John H. Crozier

(57) ABSTRACT

In a preferred embodiment, a linear/rotary motor, including: a housing; an output shaft extending from the housing; a rotary motor disposed within the housing, the output shaft being given rotational motion by the rotary motor; a linear motor disposed within the housing; a linear shaft axially moveable by the linear motor; and a coupling to join the linear shaft and the output shaft to permit transfer of axial motion from the linear shaft to the output shaft but to isolate rotational motion of the output shaft from the linear shaft.

12 Claims, 4 Drawing Sheets

LINEAR/ROTARY MOTOR AND METHOD OF USE

CROSS-REFERENCE TO RELATED APPLICATION

The present application is a continuation-in-part of co-pending application Ser. No. 08/247,891, filed May 23, 1994, and titled LINEAR/ROTARY MOTOR.

BACKGROUND OF THE INVENTION

1. Field of the Invention.

The present invention relates to electric motors generally and, more particularly, but not by way of limitation, to a novel electric motor which provides both linear and rotary motion at a single output shaft.

2. Background Art.

In certain applications, it is desirable to have a shaft which may selectively rotate and/or reciprocate. Such an application, for example, is in the robotic picking and placing of components where it may be required to axially move a component to an insertion position and then rotate the component to screw it in place. Conventional motor arrangements are often complicated and heavy, a substantial disadvantage for robotics applications. Another type of application requiring a shaft which may selectively rotate and/or reciprocate is in the precise control of laparoscopic and other such medical instruments.

In either type of application, it is frequently required that the linear motion be locked while rotary motion takes place. For a rotary/linear motor, this makes it desirable that the linear and rotary motions be controllable independently of one another.

A problem with motors having linear motion is that the motors frequently provide inadequate output shaft support when heavy side loads are imposed on the output shafts thereof.

Accordingly, it is a principal object of the present invention to provide an electric motor which provides both linear and rotary motion at a single output shaft.

It is an additional object of the invention to provide such an electric motor in which linear and rotary motions are controllable independently of one another.

It is another object of the invention to provide such an electric motor in which linear motion can be locked while rotary motion is provided.

It is a further object of the invention to provide such a motor that is simple and economical to manufacture.

An additional object of the invention is to provide such a motor that is lightweight and compact.

Another object of the invention is to provide a linear-type motor that has sufficient structure to support heavy side loads on the output shafts thereof.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, a linear/rotary motor, comprising: a housing; an output shaft extending from said housing; a rotary motor disposed within said housing, said output shaft being given rotational motion by said rotary motor; a linear motor disposed within said housing; a linear shaft axially moveable by said linear motor; and coupling means to join said linear shaft and said output shaft to permit transfer of axial motion from said linear shaft to said output shaft but to isolate rotational motion of said output shaft from said linear shaft.

BRIEF DESCRIPTION OF THE DRAWING

Understanding of the present invention and the various aspects thereof will be facilitated by reference to the accompanying drawing figures, submitted for purposes of illustration only and not intended to define the scope of the invention, and on which.

DETAILED DESCRIPTION OF THE PREFERRED EMBODIMENTS

Figure 1:
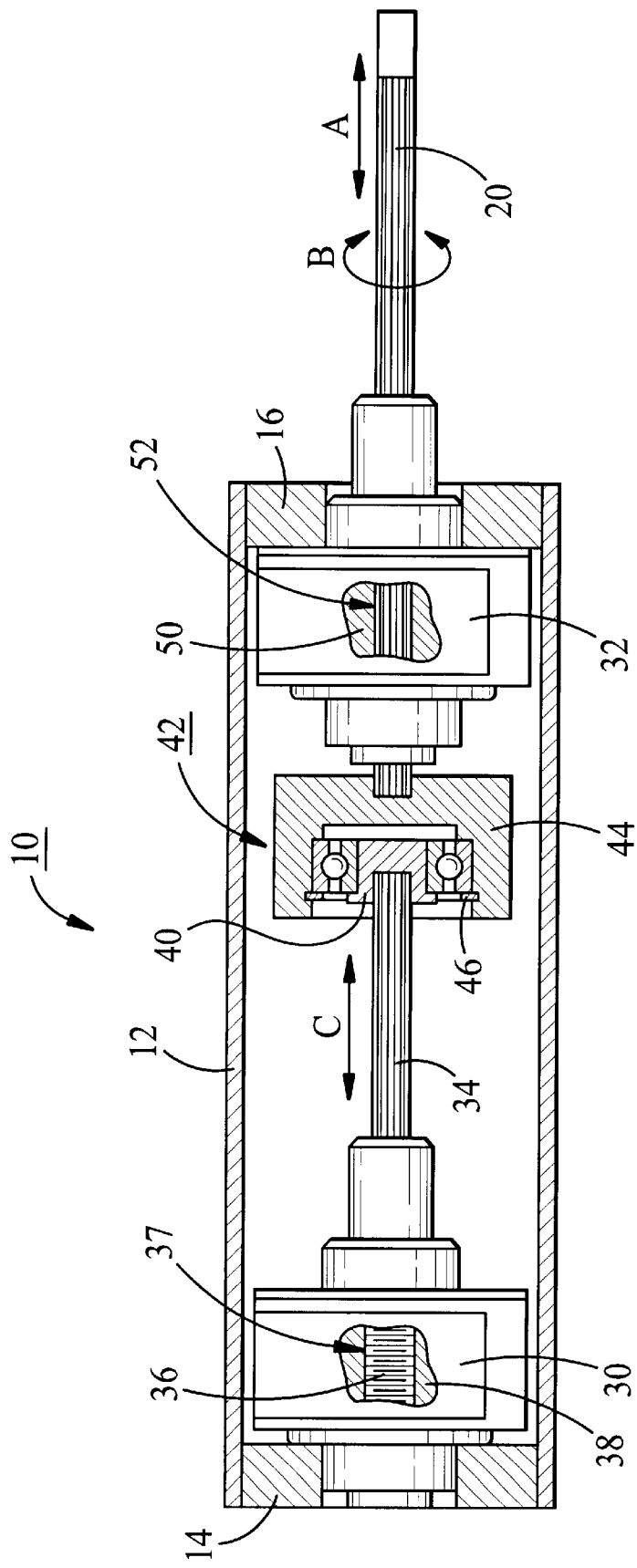
FIG. 1 is is a side elevational view, partially in cross-section and partially cut-away, of one embodiment of a linear/rotary motor constructed according to the present invention.

Reference should now be made to the drawing figures, on which similar or identical elements are given consistent identifying numerals throughout the various figures, and on which parenthetical references to figure numbers direct the reader to the view(s) on which the element(s) being described is (are) best seen, although the element(s) may be seen also on other views.

Referring now to FIG. 1, there is illustrated one embodiment of a linear/rotary electric motor, generally indicated by the reference numeral 10, and constructed according to the present invention.

Motor 10 includes a generally hollow housing 12 having end plates 14 and 16 fixedly attached at either end thereof. An output shaft 20 extends from end plate 16 and may move axially, as indicated by the arrow "A", or the output shaft may rotate in either or both directions of rotation, as indicated by the arrow "B".

Disposed interiorly of housing 12 is a linear motor 30 which is fixedly attached to end plate 14 and a rotary motor 32 which is fixedly attached to end plate 16. Linear motor 30 has a splined shaft 34 extending therefrom and axially moveable within housing 12, as indicated by the arrow "C". Splined shaft 34 is integral with a threaded shaft 36 which passes through a threaded bore 37 axially defined internally through rotor 38 of linear motor 30, such that rotary motion of the rotor causes shaft 36 to move axially within the linear motor and, thus, causes shaft 34 to move axially within the housing.

The distal end of shaft 34 is fixedly attached to an inner bearing member 40 of a shaft coupling, the latter generally indicated by the reference numeral 42. Inner bearing member 40 is disposed within an outer bearing member 44, the inner and outer bearing members being constructed of suitable bearing materials and being arranged for relative rotational motion therebetween. Inner bearing member 40 is held within outer bearing member 44 by means of a snap ring 46.

Output shaft 20 is also the shaft for rotary motor 32 and rotates as the rotor 50 of the rotary motor rotates, as indicated by the arrow "B". The proximal end of shaft 20 is fixedly attached to outer bearing member 44. Shaft 20 is splined and passes through a central bore 52 defined through rotor 50, the bore having a configuration complementary to the spline of shaft 20. So configured, shaft 20 will rotate as rotor 50 rotates, but the shaft can freely move axially within the rotor.

In operation, output shaft 20 is given axial motion by linear motor 30 axially driving shaft 34, with the axial motion thereof transferred through shaft coupling 42 by the axial motion thereof to shaft 20. The axial motion of shaft 20 is unaffected by any rotary output of rotary motor 32. Any such rotary output of rotary motor 32 is isolated from shaft 34 and linear motor 30 by means of shaft coupling 42. The isolation of rotary motion from linear motor 30 is critical when the linear motor is of the lead screw type.

Linear motor 30 and rotary motor 32 may be any conventional types of such motors and the rotary motor may be a stepper motor such as furnished by Haydon Switch and Instrument, Inc., of Waterbury, Conn.

It can be seen that motor 10 is compact, relatively lightweight, and very simply and economically constructed.

An important feature of motor 10 is that linear motor 30 may be locked to prevent axial motion of output shaft 20 while the output shaft is being rotated by rotary motor 32. Such locking may be accomplished in one of two ways. First, if the pitch of the threads on shaft 34 is relatively fine, say, 0.024" or finer, simply de-energizing the stator coils of linear motor 30 will result in locking of that shaft (and output shaft 20) and axial force applied to the output shaft will not cause the shafts to backdrive. On the other hand, if the pitch of shaft 34 is relatively coarse, say, 0.048" or coarser, axial force applied to shaft 34 will cause the shaft to backdrive. In the latter case, energization of both stator coils in motor 30 will electromagnetically lock up the motor rotor and lock shaft 34 (and output shaft 20) in place to resist axial movement of the output shaft.

In like manner, the coils of motor 32 can be energized so as to lock rotary motion of output shaft 20.

Figure 2:
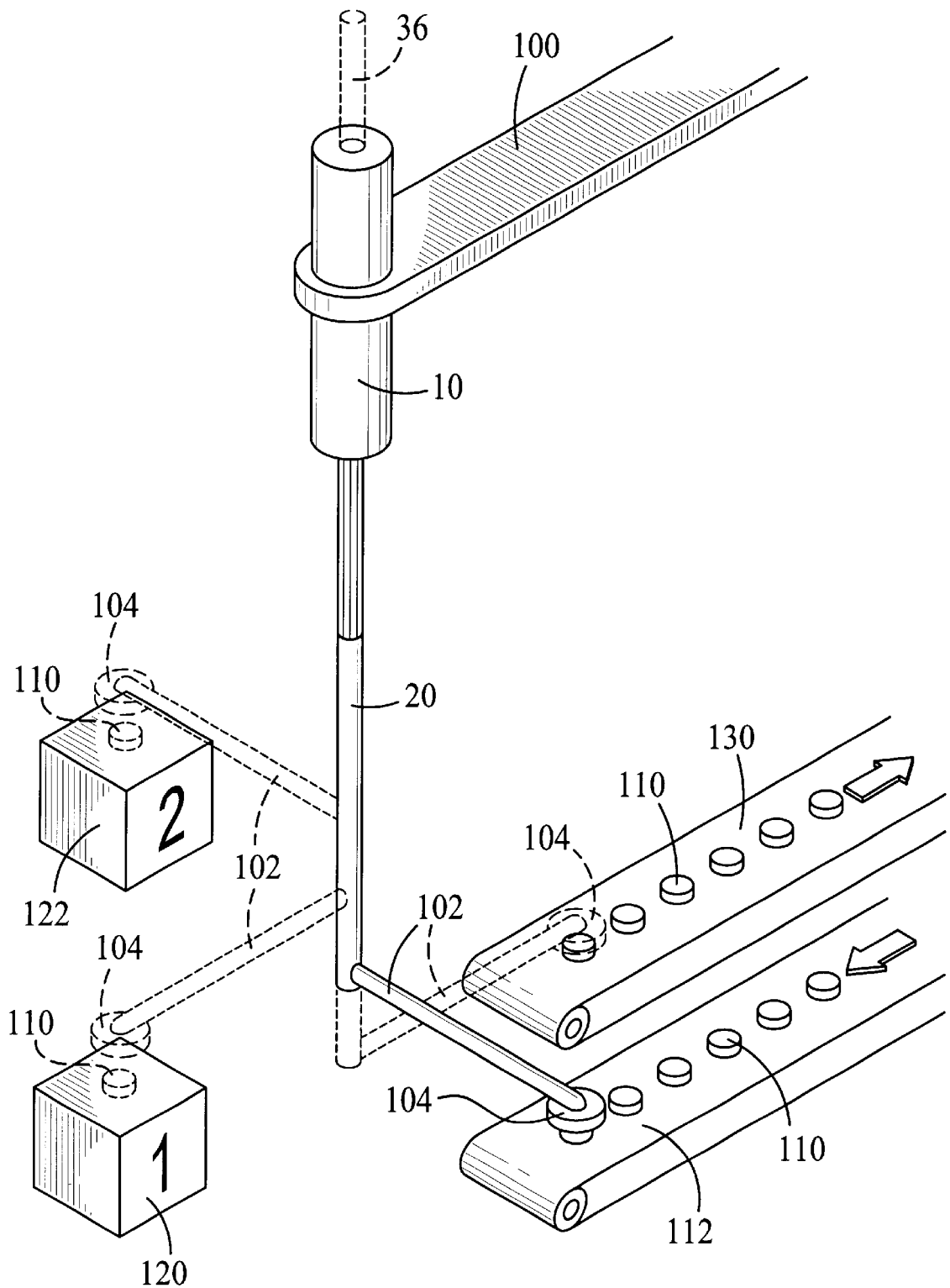
FIG. 2 is an isometric view of a manufacturing operation employing a robotic operator with the linear/rotary motor of FIG. 1.

FIG. 2 illustrates a manufacturing operation employing motor 10 and illustrating the use of linear locking. Elements common to those shown on FIG. 1 are given like reference numerals. Here, motor 10 is mounted vertically at the distal end of a robotic arm or other supporting structure 100. A horizontal arm 102 is fixedly attached to the distal end of shaft 20 and an electromagnet 104 is fixedly mounted to the distal end of the horizontal arm. Electromagnet 104 is shown (solid lines) at a first elevation in position to pick up a part, as at 110, from the surface of an incoming conveyor belt 112. It may be assumed that output shaft 20 has been moved axially to the first elevation, shaft 34 (and the output shaft) locked, and shaft 20 rotated to the pickup position (solid lines). After electromagnet 104 picks up part 110, linear motor 30 (FIG. 1) is energized to raise arm 102 to a second elevation and shaft 20 is linearly locked and then rotated clockwise by rotary motor 32 (FIG. 1) to place part 110 on a first workstation 120. After a manufacturing operation takes place at first workstation 120, part 110 is similarly raised to a third elevation and moved clockwise to a second workstation 122. After completion of the manufacturing operation at second workstation 122, arm 102 is rotated slightly clockwise, lowered to a fourth elevation, and rotated clockwise so that part 110 may be placed on the surface of an outgoing conveyor 130.

Figure 3:
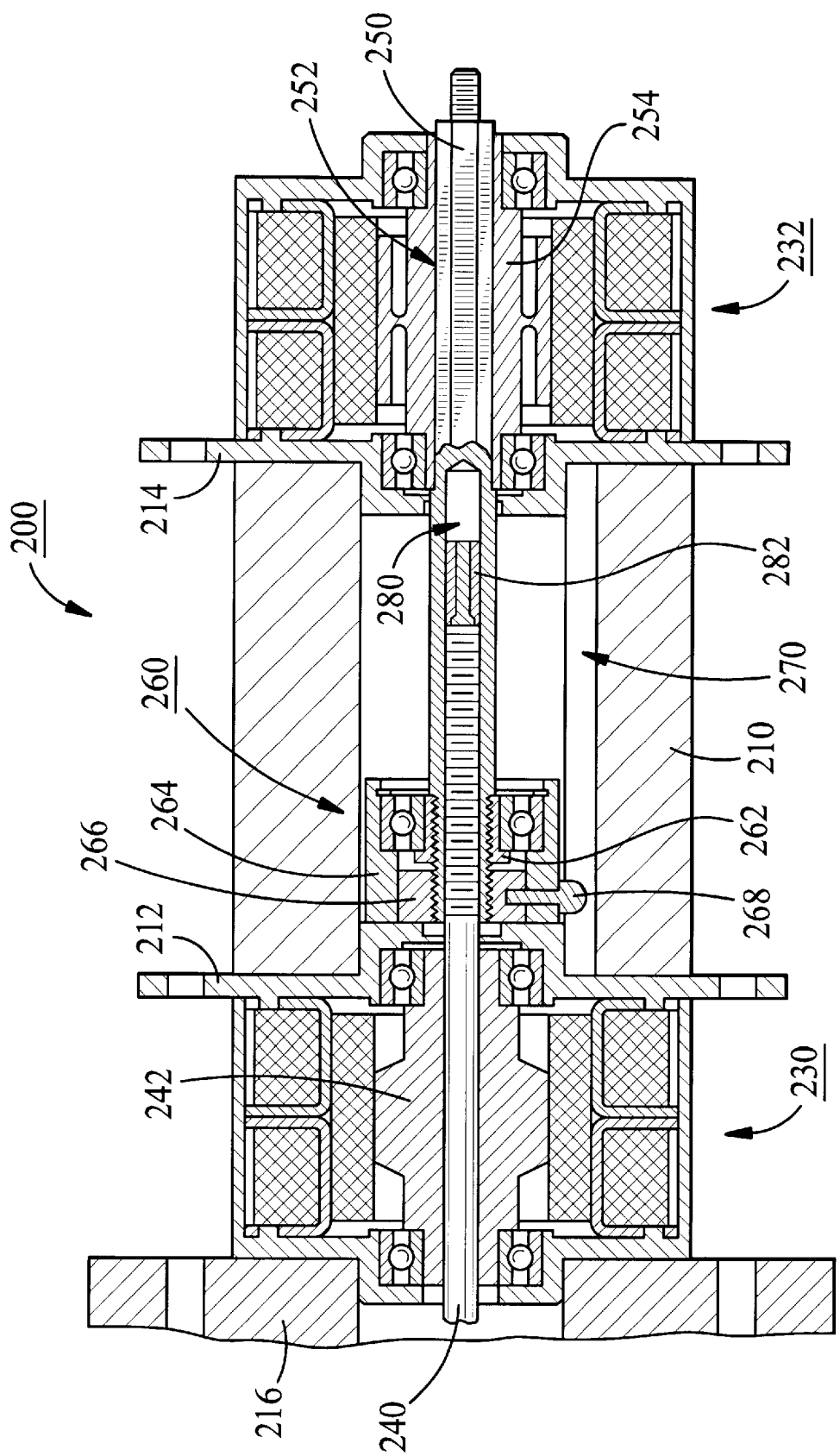
FIG. 3 is a side elevational view, partially in cross-section and partially cut-away, of another embodiment of a linear/rotary motor constructed according to the present invention.

FIG. 3 illustrates another embodiment of a linear/rotary motor, generally indicated by the reference numeral 200, and constructed according to the present invention. As will be seen, motor 200, although somewhat more complicated than motor 10 (FIG. 1), requires less total axial space for a given amount of linear motion.

Motor 200 includes a cylindrical, central shell portion 210 disposed between flanges 212 and 214, the flanges being attached to a base plate 216 by suitable fastening means (not shown). Disposed at either end of motor 200 are linear and rotary motors 230 and 232, respectively, having the same general functions as motors 30 and 32 of motor 10 (FIG. 1). In this case, however, motor 230 is of the type having the proximal end of a lead screw shaft 240 bonded to an aluminum rotor hub 242, rather than being axially moveable within the rotor hub. A hexagonal, rotary output shaft 250 extends from an end of motor 200 and passes through a complementarily shaped axial bore 252 defined centrally of a rotor hub 254 in rotary motor 232.

A shaft coupling, generally indicated by the reference numeral 260, joins the proximal ends of lead screw 240 and output shaft 250, the shaft coupling having an inner member 262 threadedly joined to the proximal end of the output shaft and an outer member 264 joined to a nut follower 266 by means of an anti-rotation pin 268. Nut follower 266 engages lead screw 240 such that rotation of the lead screw causes axial back-and-forth motion of shaft coupling 260 and, therefore, the proximal end of output shaft 250. The head of anti-rotation pin 268 engages and moves back-and-forth in an axial channel 270 defined in the inner surface of shell 210 to prevent the rotation of shaft coupling 260. Thus, shaft coupling 260 isolates the linear and rotary functions of motor 200, similar to purpose of shaft coupling 46 (FIG. 1) of motor 10.

One feature of motor 200 which contributes to the compactness thereof is that the proximal end of lead screw 240 moves axially telescopingly within an axial bore defined centrally of the proximal end of output shaft 250 as the output shaft moves axially back and forth. A bronze bushing fixedly attached to the distal end of lead screw 240 provides support therefor within output shaft 250. Another feature of motor 200 which contributes to the compactness thereof is that, because of the use of fixed lead screw 240, motor 230 does not require any external support for lead screw 240, in contrast to the external support extending from motor 30 (FIG. 1) of motor 10 to support axially moveable splined shaft 34.

Motor 200 may be employed in the same manner as motor 10, as described above with reference to FIG. 2.

Figure 4:
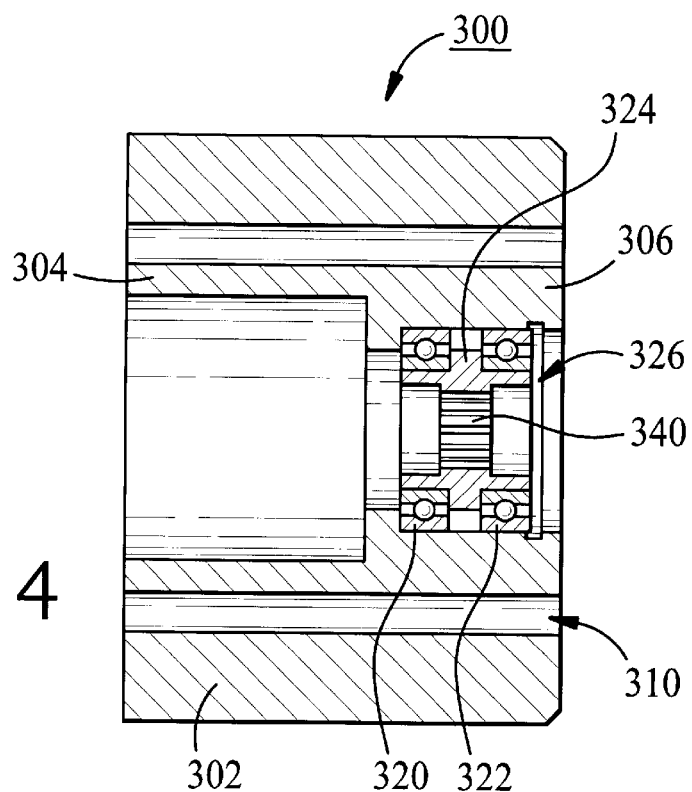
FIG. 4 is a side elevational view, partially in cross-section, of one embodiment of an end structure for supporting heavy side loads on the output shaft of a linear-type motor.

FIG. 4 illustrates one embodiment of a shaft support structure, generally indicated by the reference numeral 300, useful for supporting a linear or linear/rotary motor shaft (neither type shown) when the shaft is used in an environment in which it will experience heavy side loads such as might be imposed by horizontal arm 102 (FIG. 2).

Structure 300 includes a housing 302 having first and second ends 304 and 306, respectively. Structure 300 also includes a plurality of channels, as at 310 defined axially therethrough, to accept therein fasteners (not shown) for the attachment of first end 304 of the structure to, for example, end plate 16 of motor 10 (FIG. 1).

Disposed interiorly of structure 300 and near second end 306 are two, spaced apart ball bearing members 320 and 322 having sandwiched therebetween an insert 324. Insert 324 is preferably formed form Delrin or a suitable metallic material having good lubricity. Ball bearing members 320 and 322 and insert 324 are secured in place by means of a snap ring (not shown) inserted in a counterbore 32.

When structure 300 is assembled to motor 10 (FIG. 1) as described above, splined shaft 20 will extend through center bore 340 of insert 324, the center bore having a configuration complementary to that of the splined shaft. Thus, any rotary motion of shaft 20 will be transmitted to ball bearing members 320 and 322 by insert 324, while any linear motion of shaft 20 will cause the axial sliding of the shaft on the center bore 340 of the insert. Since ball bearings 320 and 322 and insert 324 are disposed well away from first end 204 of structure 300 which is mounted to end plate 16 (FIG. 1), shaft 20 is given good support against deflection by heavy side loads and shaft runout is reduced.

Figure 5:
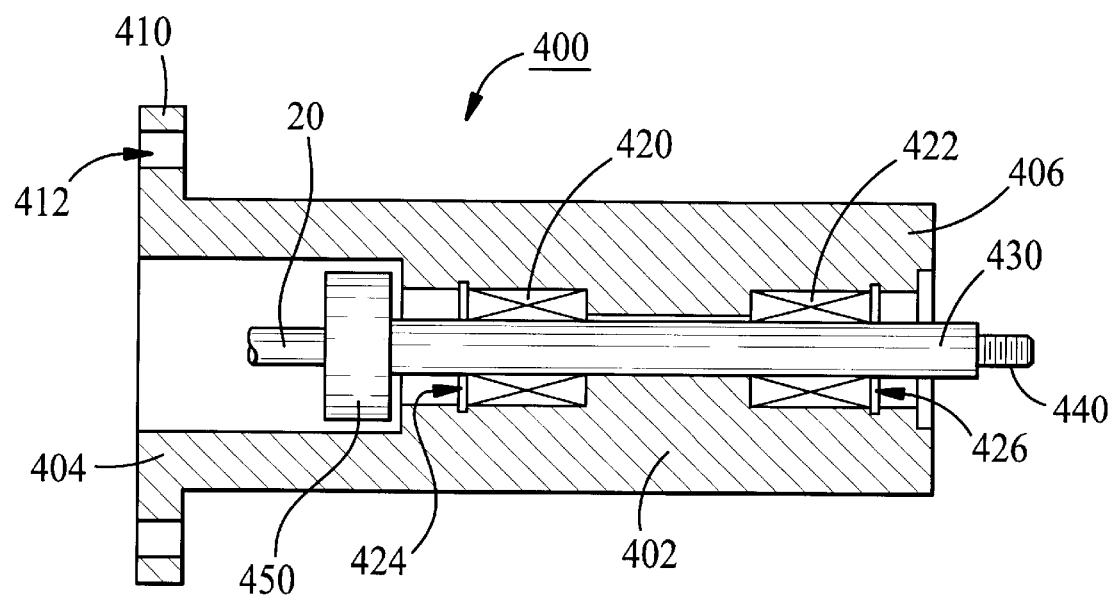
FIG. 5 is a side elevational view, partially in cross-section, of another embodiment of an end structure for supporting heavy side loads on the output shaft of a linear-type motor.

FIG. 5 illustrates another embodiment of a shaft support structure, generally indicated by the reference numeral 400, also useful for supporting shafts with heavy side loads.

Structure 400 includes a housing 402 having first and second ends 404 and 406, respectively. A mounting flange 410 formed at first end 404 has a plurality of holes defined therethrough for the attachment by fasteners (not shown) of structure 400 to end plate 16 of motor 10 (Figure).

Disposed approximately medially between first and second ends 404 and 406 is a first rotary/linear recirculating ball bearing member 420 and disposed near the second end is a second rotary/linear recirculating ball bearing member 422, the first and second ball bearing members being coaxially aligned centrally of housing 402. First bearing member 420 is secured in place by means of a snap ring (not shown) inserted in a counterbore 424 and second bearing member 422 is secured in placed by means of a snap ring (not shown) inserted in a counterbore 426.

A cylindrical secondary output shaft 430 is supported by and extends through first and second bearing members 420 and 422 and has its distal end extending from second end 406 of structure 400.

The distal end of secondary output shaft 430 terminates in a threaded portion 440 for the attachment thereto of a fixture, for example. The proximal end of secondary output shaft 430 is attached to an optional flexible coupling 450 for joining to shaft 20 of motor 10 (FIG. 1), for example, or the shaft of another motor. Alternatively, if radial motion does not have to be accommodated, secondary output shaft 430 may be an extension of output shaft 20. As was the case with structure 300 (FIG. 4), bearings 420 and 422 are disposed well away from first end 204 of structure 400 which is mounted to end plate 16 (FIG. 1), and shaft 20 is, thusly, given good support against deflection by heavy side loads and runout is reduced.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

We claim:

1. A linear/rotary motor, comprising:
   (a) a primary housing;
   (b) an output shaft extending from said primary housing;
   (c) a rotary motor disposed entirely within said primary housing, said output shaft being given rotational motion by said rotary motor;
   (d) a linear motor disposed entirely within said primary housing;
   (e) a linear shaft moveable by said linear motor to impart linear motion to said output shaft; and
   (f) coupling means to join said linear shaft and said output shaft to permit imparting of said linear motion to said output shaft by said linear shaft, but to isolate rotational motion of said output shaft from said linear shaft, such that linear and rotational motions of said output shaft can be controlled independently of one another.

2. A linear/rotary motor, as defined in claim 1, wherein: said output shaft has a non-cylindrical shape in cross-section and passes through a complementarily shaped, axial, central bore defined in the rotor of said rotary motor so that said rotor gives rotational motion to said output shaft by engagement therewith as said rotor rotates.

3. A linear/rotary motor, as defined in claim 1, wherein:
   (a) said linear shaft moves axially within said linear motor; and
   (b) said coupling means comprises inner and outer bearing members arranged for relative rotational motion therebetween, with one of said linear shaft and said output shaft fixedly attached to one of said inner and outer bearing members and the other of said linear shaft and said output shaft fixedly attached to the other of said inner and outer bearing members.

4. A linear/rotary motor, as defined in claim 1, wherein:
   (a) said linear shaft is a lead screw fixedly attached to a rotor of said linear motor; and
   (b) said coupling means comprises inner and outer bearing members arranged for relative rotational motion therebetween, with said output shaft fixedly attached to said inner member and said linear shaft being slidingly attached to said outer member by means of a threaded nut follower engaging said lead screw and fixedly attached to said outer member.

5. A linear/rotary motor, as defined in claim 1, wherein: said output shaft and said linear shaft are co-linear.

6. A linear/rotary motor, as defined in claim 1, wherein: said linear motor can be electromagnetically locked in position to prevent linear motion of said output shaft as said output shaft is rotated by said rotary motor.

7. A linear/rotary motor, as defined in claim 1, wherein: said rotary motor can be electromagnetically locked in position to prevent rotary motion of said output shaft as said output shaft is moved linearly by said linear motor.

8. A linear/rotary motor, as defined in claim 1, further comprising: a first bearing member supporting said output shaft and spaced well away from said primary housing so as to support said output shaft against deflection from heavy side loads.

9. A linear/rotary as defined in claim 8, further comprising:
   (a) a secondary housing attached to said primary housing, into which secondary housing said output shaft extends; and
   (b) said first bearing member is disposed in said secondary housing.

10. A linear/rotary motor, as defined in claim 8, further comprising: a second bearing member supporting said output shaft and spaced well away from said primary housing.

11. A linear/rotary motor, as defined in claim 9, further comprising: a second bearing member disposed in said secondary housing.

12. A linear/rotary motor, comprising:

(a) a primary housing;

(b) an output shaft extending from said primary housing;

(c) a rotary motor disposed entirely within said primary housing, said output shaft being given rotational motion by said rotary motor;

(d) a linear motor disposed entirely within said primary housing;

(e) a linear shaft, comprising a lead screw fixedly attached to a rotor of said linear motor, and moveable by said linear motor to impart linear motion to said output shaft;

(f) coupling means to join said linear shaft and said output shaft to permit imparting of said linear motion to said output shaft by said linear shaft, but to isolate rotational motion of said output shaft from said linear shaft, such that linear and rotational motions of said output shaft can be controlled independently of one another;

(g) said coupling means comprising inner and outer bearing members arranged for relative rotational motion therebetween, with said output shaft fixedly attached to said inner member and said linear shaft being slidingly attached to said outer member by means of a threaded nut follower engaging said lead screw and fixedly attached to said outer member; and (h) wherein: a portion of said lead screw moves telescopingly within said output shaft as said output shaft moves axially back and forth.

* * * * *